(12) United States Patent
DelRocco et al.

(10) Patent No.: US 8,798,989 B2
(45) Date of Patent: Aug. 5, 2014

(54) AUTOMATED CONTENT GENERATION

(75) Inventors: Anthony J. DelRocco, Clearwater, FL (US); Sally A. Chambless, Redington Beach, FL (US)

(73) Assignee: Raytheon Company, Waltham, MA (US)

( * ) Notice: Subject to any disclaimer, the term of this patent is extended or adjusted under 35 U.S.C. 154(b) by 436 days.

(21) Appl. No.: 13/307,375

(22) Filed: Nov. 30, 2011

(65) Prior Publication Data

US 2013/0138426 A1 May 30, 2013

(51) Int. Cl.
*G10L 15/00* (2013.01)

(52) U.S. Cl.
USPC ............................ 704/9; 704/10; 707/4

(58) Field of Classification Search
USPC .............................. 704/9, 10; 707/4
See application file for complete search history.

(56) References Cited

U.S. PATENT DOCUMENTS

| | | | |
|---|---|---|---|
| 6,044,375 A | 3/2000 | Shmueli et al. | |
| 6,199,034 B1 * | 3/2001 | Wical | 704/9 |
| 6,778,979 B2 * | 8/2004 | Grefenstette et al. | 1/1 |
| 7,624,130 B2 * | 11/2009 | Chen et al. | 1/1 |
| 2004/0261016 A1 | 12/2004 | Glass et al. | |
| 2006/0288285 A1 | 12/2006 | Lai et al. | |
| 2008/0059454 A1 | 3/2008 | Andrieu | |
| 2008/0140385 A1 * | 6/2008 | Mahajan et al. | 704/9 |
| 2010/0030765 A1 | 2/2010 | Chi et al. | |
| 2010/0131482 A1 | 5/2010 | Linthicum et al. | |
| 2010/0180213 A1 | 7/2010 | Karageorgos et al. | |
| 2013/0085828 A1 * | 4/2013 | Schuster | 705/14.25 |

FOREIGN PATENT DOCUMENTS

WO 2011129993 10/2011

OTHER PUBLICATIONS

Diekema, Anne R.; The Metadata Assignment and Search Tool Project; Center for Natural Language Processing; Syracuse University; Apr. 18, 2008.

* cited by examiner

*Primary Examiner* — Daniel D Abebe
(74) *Attorney, Agent, or Firm* — Burns & Levinson LLP; Joseph M. Maraia

(57) ABSTRACT

Described are computer-based methods and apparatuses, including computer program products, for automated content generation. In some examples, the method includes generating content metadata from document content via natural language processing based on one or more context parameters associated with the document content. The method can further include receiving user feedback about the content metadata from a computing device associated with a user associated with the document content. The method can further include modifying the one or more context parameters based on the received user feedback.

15 Claims, 7 Drawing Sheets

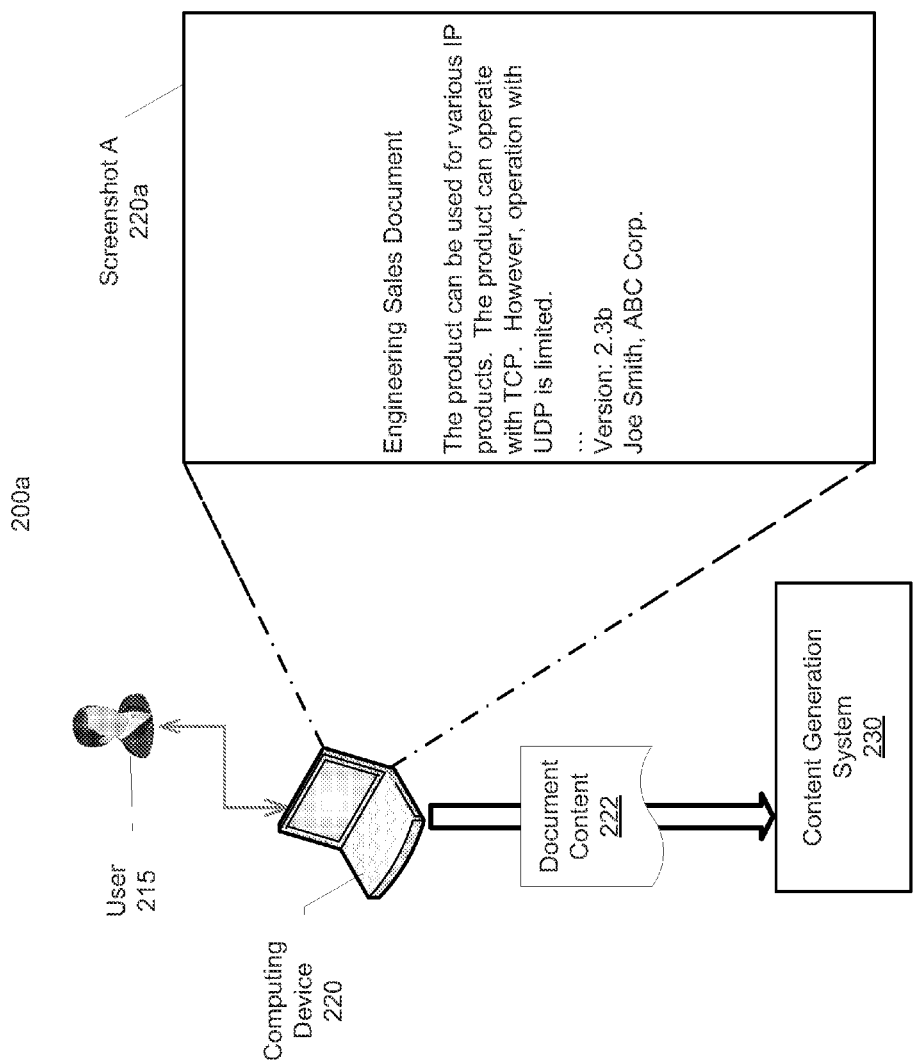

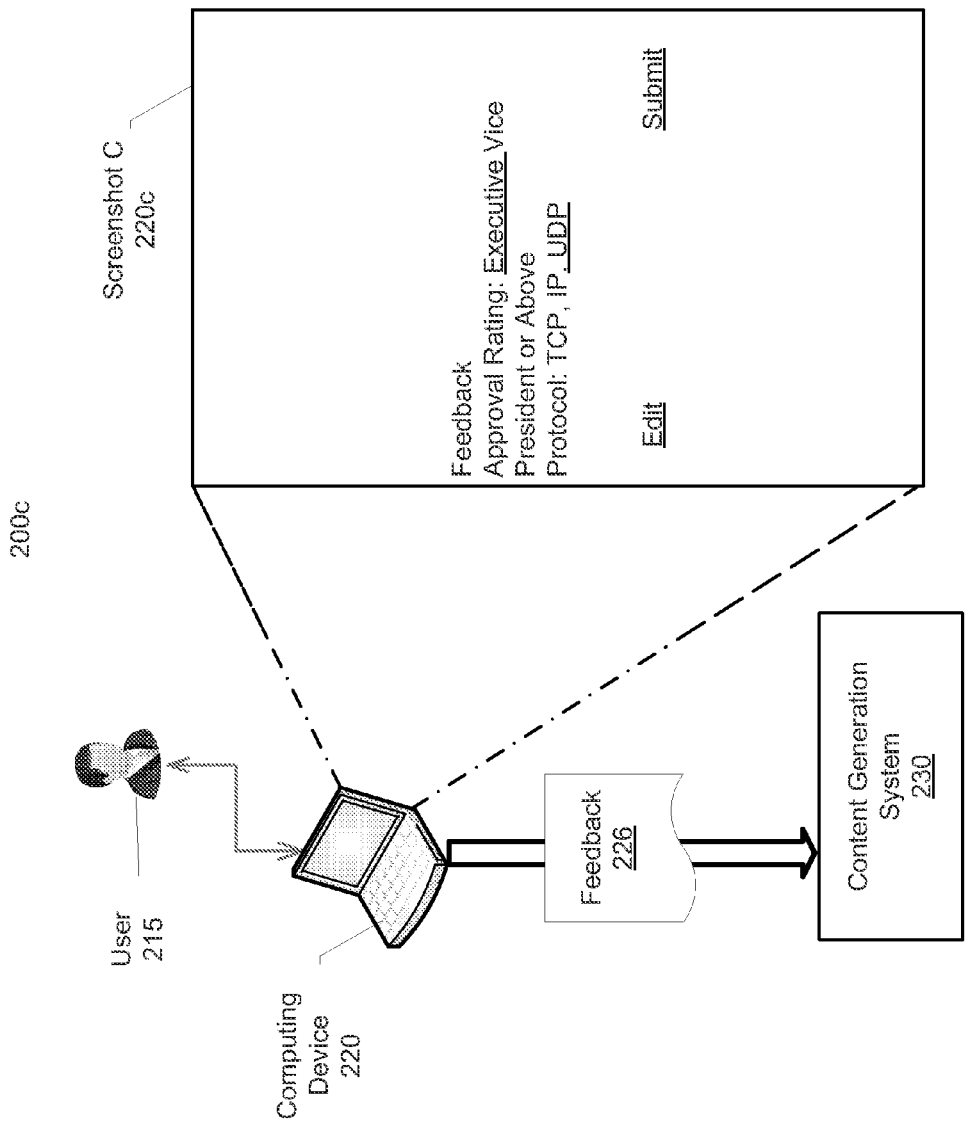

AUTOMATED CONTENT GENERATION

BACKGROUND

Accurate content generation for information is challenging due to issues with determining the meaning of the information. Previous attempts for content generation utilized back-end servers to post-process the information for the extraction of content (e.g., metadata). The back-end server utilized back-end algorithms to analyze information and derive meaning from the information. However, since the back-end algorithms are trying to determine what the author of the information is meaning (i.e., intent of the author), the content generated post-process is generally inaccurate. Further, finding information using the content is challenging, if not impossible, because of the inaccuracy of the content. Thus, a need exists in the art for improved automated content generation.

SUMMARY

One approach is a system that provides automated content generation. The system includes a content analysis module, a communication module, and a context analysis module. The content analysis module generates content metadata from document content via natural language processing based on one or more context parameters associated with the document content. The communication module receives user feedback about the content metadata from a computing device associated with a user associated with the document content. The context analysis module modifies the one or more context parameters based on the received user feedback.

Another approach is a method that provides automated content generation. The method includes (a) generating content metadata from document content via natural language processing based on one or more context parameters associated with the document content. The method further includes (b) receiving user feedback about the content metadata from a computing device associated with a user associated with the document content. The method further includes (c) modifying the one or more context parameters based on the received user feedback.

Another approach is a computer program product that provides automated content generation. The computer program product is tangibly embodied in an information carrier. The computer program product includes instructions being operable to cause a data processing apparatus to generate content metadata from document content via natural language processing based on one or more context parameters associated with the document content; receive user feedback about the content metadata from a computing device associated with a user associated with the document content; and modify the one or more context parameters based on the received user feedback.

In other examples, any of the approaches above can include one or more of the following features.

In some examples, the system further includes a metadata modification module. The metadata modification module modifies the content metadata based on the received user feedback.

In other examples, the system further includes a user interaction module. The user interaction module receives the document content from the computing device associated with the user; and requests user feedback about the content metadata from the user associated with the document content.

In some examples, the context analysis module generates the one or more context parameters based on an activity associated with a type of document content and/or domain information associated with the activity.

In other examples, the domain information includes information associated with persons, entities, locations, and/or multimedia data.

In some examples, the domain information includes status information, predetermined pattern information, keyword information, and/or multimedia information.

In other examples, the method further includes (d) modifying the content metadata based on the received user feedback.

In some examples, the steps generating (a), receiving (b), and modifying (c) are processed substantially in real-time after receipt of the document content.

In other examples, the method further includes (a-1) receiving the document content from the computing device associated with the user. In some examples, the steps receiving (a-1), generating (a), receiving (b), and modifying (c) occur sequentially in substantially real-time.

In some examples, the method further includes (d) generating second content metadata from second document content via natural language processing based on the modified one or more context parameters associated with the second document content; (e) receiving second user feedback about the second content metadata from a second user associated with the second document content; and (f) modifying the one or more context parameters based on the received user feedback.

In other examples, the method further includes (g) modifying the second content metadata based on the second user feedback.

In some examples, the one or more context parameters are indicative of an activity associated with the document content.

In other examples, the content metadata includes metadata about the document content, one or more concepts associated with the document content, and/or one or more indicators associated with the document content.

The automated content generation techniques described herein can provide one or more of the following advantages. An advantage of the technology is that the combination of the human intelligence with the automated natural language processing techniques to generate metadata content increases the efficiency and effectiveness of the search and analysis process for the document content by increasing the accuracy of the search and analysis process. Another advantage of the technology is that the combination of the human intelligence with the automated natural language processing techniques at or about the time of authoring the document content enables the meaning of the document content to be accurately encoded, thereby decreasing the cost of searching for the document content in the future.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 2A-2C illustrate exemplary screenshots of computing devices;

DETAILED DESCRIPTION

Figure 1:
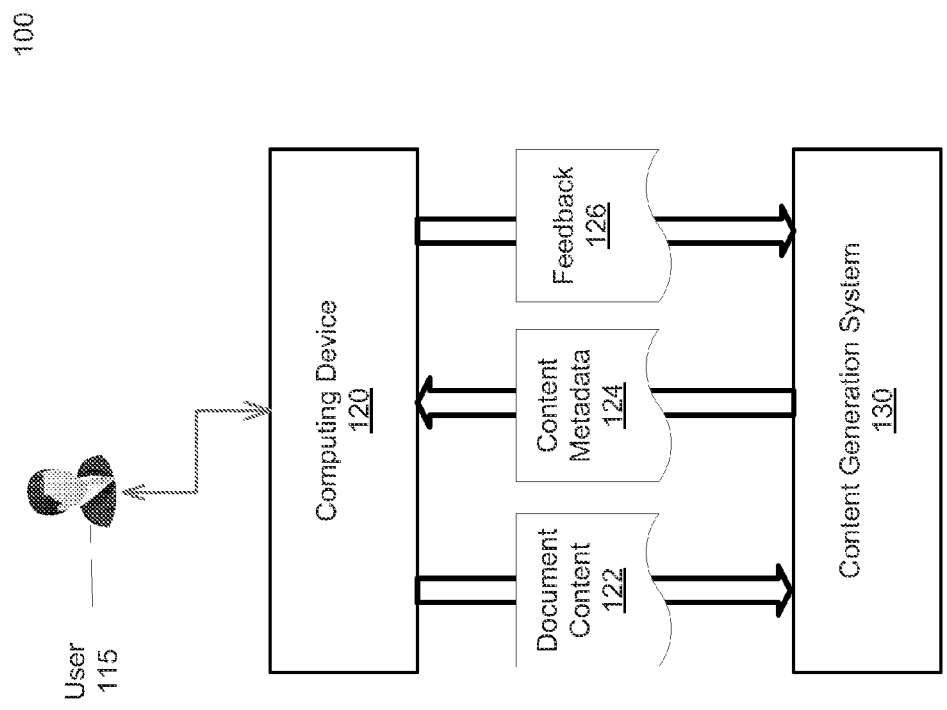
FIG. 1 is a diagram of an exemplary content generation environment.

The automated content generation method and apparatus includes technology that, generally, combines human intelligence (e.g., input from the user, modifications from the user, etc.) and automation (e.g., natural language processing techniques, automated analysis techniques, etc.) to automatically generate metadata content (e.g., metadata, concept, etc.) from document content (e.g., webpage, document, etc.). The synergistic combination of the human intelligence and the automation for various applications (e.g., healthcare, intelligence, business, military, etc.) enables accurate generation of content metadata from document content, thereby decreasing the time and resources needed to find the document content in the future.

The technology can be configured based on the context of the document content (e.g., engineering document, human resource document, finance spreadsheet, etc.), thereby advantageously enabling accurate metadata content generation based on the relevant activity and increasing the accuracy of the metadata content with respect to the document content. The technology can be performed at the time that the document content is transmitted (e.g., uploaded to, emailed to, etc.) to the technology (e.g., servers executing the technology, a document management system with a plug-in for the technology, etc.), thereby enabling real-time user feedback/editing of the metadata content by the user (e.g., author, submitter, etc.). The metadata content generated by the technology can be utilized by searching and/or storage systems for accurate searching and/or storage of the document content since accurate metadata content is essential for exploratory search interfaces to fulfill their potential to improve the search experience for other users (i.e., return accurate results, increase the efficiency of the search process, etc.).

In operation, for example, a user submits document content to the technology for processing (e.g., to a document management system with the technology, to a server executing the technology, etc.). The technology analyzes the document content utilizing natural language processing techniques configured for the relevant activity (e.g., financial document, requirements document, etc.) to generate metadata content (e.g., concepts, metadata, completeness, etc.) for the document content. The user reviews and/or modifies the metadata content and transmits any user feedback (e.g., modification, addition, etc.) of the metadata content to the technology. The technology modifies the metadata content based on the feedback from the user, thereby increasing the accuracy of the metadata content by using both machine learning and human learning while decreasing the time required for the user to accurately input metadata content. The technology updates the natural language processing techniques (e.g., modifies context parameters associated with the document content, updates processing parameters associated with the natural language processing, etc.) based on the feedback from the user, thereby improving the natural language processing techniques by integrating user feedback into future metadata content generation.

FIG. 1 is a diagram of an exemplary content generation environment 100. The environment 100 includes a computing device 120 and a content generation system 130. A user 115 utilizes the computing device 120 (e.g., laptop, mobile device, etc.) to input document content 122 (e.g., text document, multimedia file, etc.) to the content generation system 130. The computing device 120 transmits the document content 122 to the content generation system 130. The content generation system 130 generates content metadata 124 (e.g., a concept, a sentiment, reading level, etc.) based on the document content 122 utilizing natural language processing and/or any other type of information analysis technique (e.g., a Bayesian network, a neural network, etc.). The content generation system 130 transmits the content metadata 124 to the computing device 120 for display to the user 115. The user 115 reviews the content metadata 124 and can input user feedback 126 utilizing the computing device 120. The computing device 120 transmits the user feedback 126 to the content generation system 130. The content generation system 130 modifies the content metadata 124 based on the user feedback 126 and/or modifies parameters associated with the natural language processing based on the user feedback 126 (e.g., updates relationship between entities, modifies importance of a term, etc.).

Although FIG. 1 illustrates a single computing device 120 and a single user 115, the content generation system 130 can be utilized by a plurality of computing devices (e.g., thirty, one hundred, etc.) and/or a plurality of users (e.g., twenty, forty, etc.). Although FIG. 1 illustrates a single operation of the content generation process, the content generation system 130 can execute a plurality of processes simultaneously or sequentially (e.g., one hundred, one thousand, etc.).

FIG. 2A illustrates an exemplary screenshot A 220a of a computing device 220. FIG. 2A illustrates a user 215 utilizing the computing device 220 to transmit document content 222 to the content generation system 230. As illustrated in the screenshot A 220a, the document content 222 is an Engineering Sales Document and includes information.

Figure 2B:
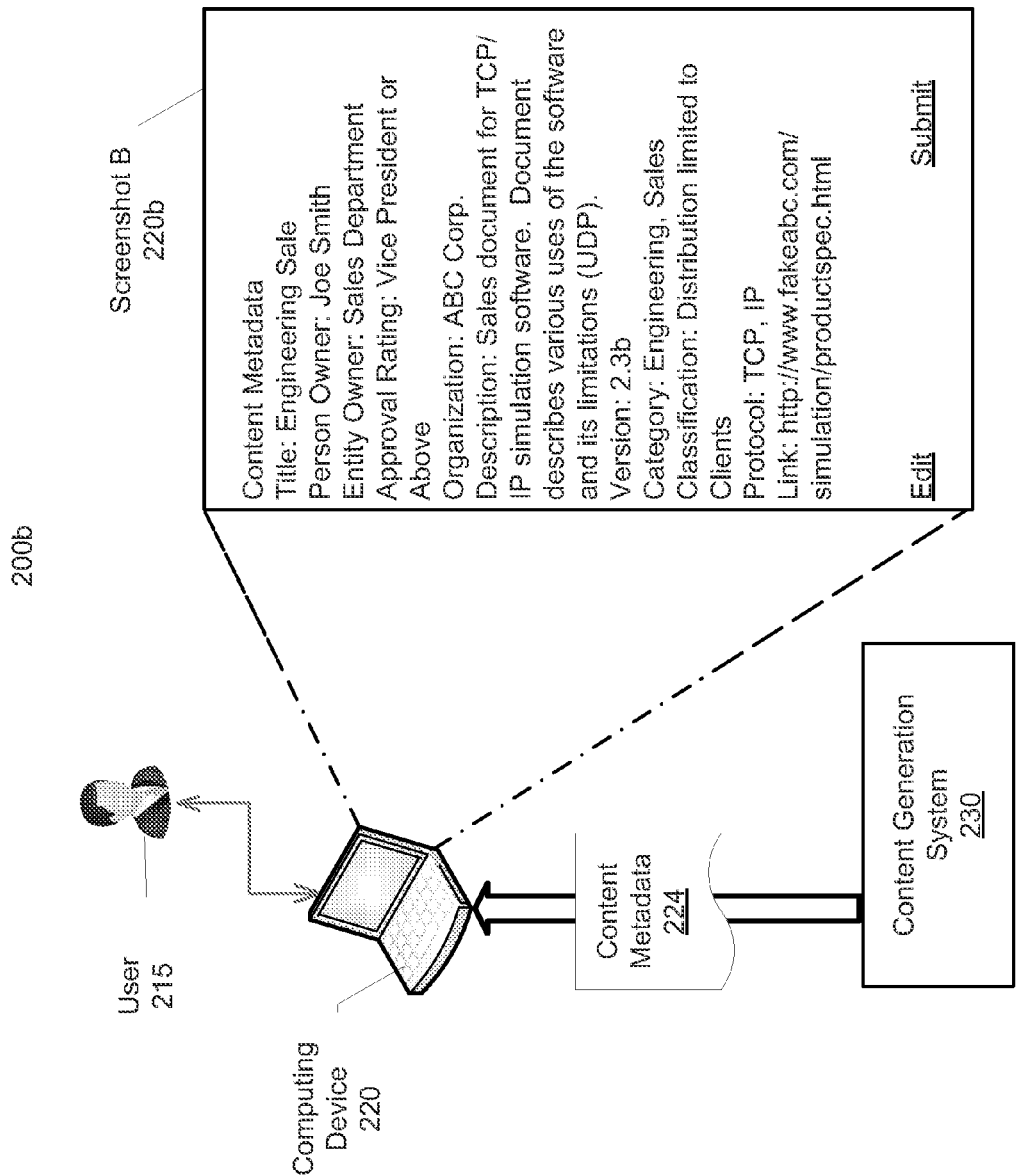

FIG. 2B illustrates an exemplary screenshot B 220b of the computing device 220. FIG. 2B illustrates the user 215 utilizing the computing device 220 to review content metadata 224 received from the content generation system 230. The content generation system 230 generates the content metadata 224 from the document content 222 via natural language processing based on one or more context parameters (e.g., engineering sales parameters, engineering parameters, etc.). As illustrated in the screenshot B 220b, the content metadata 224 describes metadata and concepts associated with the document content 222. The content metadata 224 can be utilized to store the document content 222 for future retrieval (e.g., the content metadata 224 is utilized for storage organization, the content metadata 224 is utilized to associate document content with each other, etc.) and/or searching (e.g., the content metadata 224 populates the search fields, the content metadata 224 is searched, etc.). For example, another user utilizing another computing device can search for a sales document for simulation software and a search system can return the document content 222 based on the search.

FIG. 2C illustrates an exemplary screenshot C 220c of the computing device 220. FIG. 2C illustrates the user 215 utilizing the computing device 220 to transmit user feedback 226 to the content generation system 230. As illustrated in the screenshot C 220c, the user feedback 226 includes user additions to the metadata content (in this example, additions to the approval rating field and the protocol field).

Figure 3:
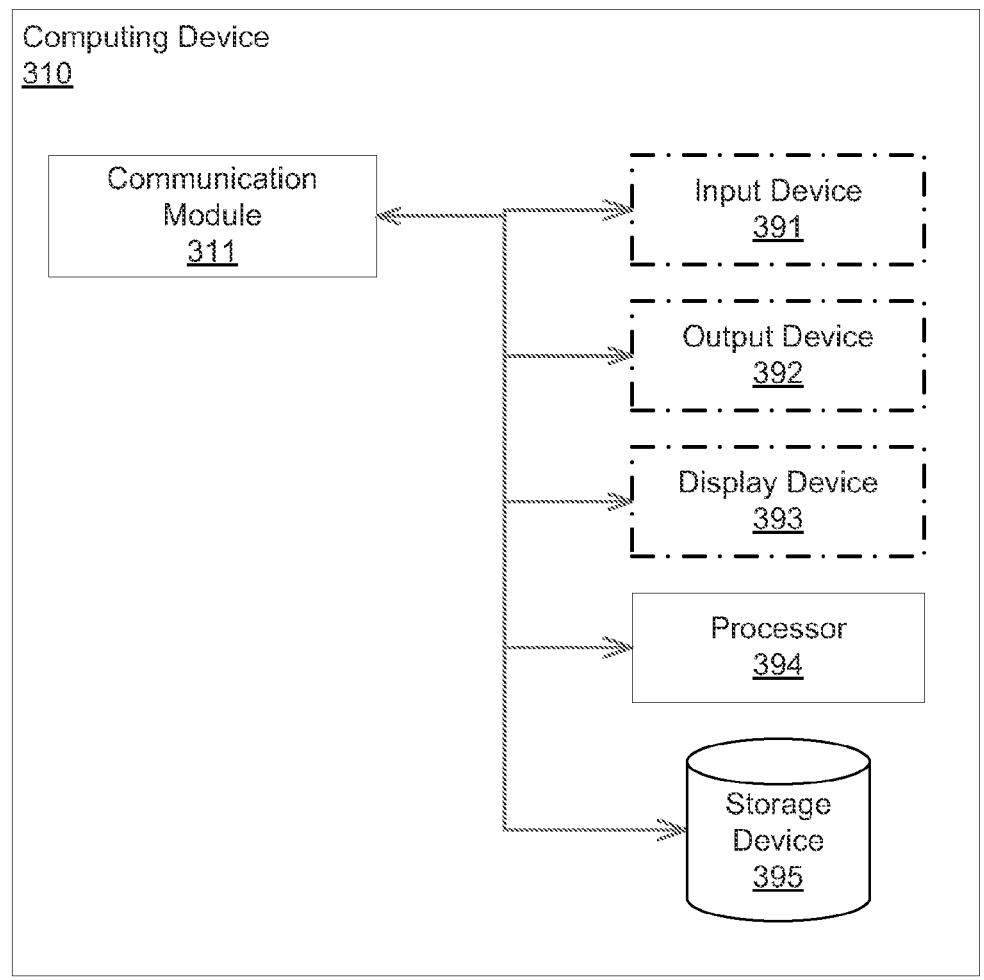
FIG. 3 is a diagram of an exemplary computing device.

FIG. 3 is a diagram of an exemplary computing device 310. The computing device 310 includes a communication module 311, an input device 391, an output device 392, a display device 393, a processor 394, and a storage device 395. The input device 391, the output device 392, and the display device 393 are optional components of the computing device 310. In some examples, the computing device 310 can include some or all of the modules/devices as described herein. The modules and devices described herein can, for example, utilize the processor 394 to execute computer executable instructions and/or one or more modules can each include their own processor to execute computer executable instructions (e.g., an encryption processing unit, a field programmable gate array processing unit, etc.). It should be understood that the computing device 310 can include, for example, other modules, devices, and/or processors known in the art and/or varieties of the illustrated modules, devices, and/or processors.

The communication module 311 communicates information to/from the computing device 310. The communication module 311 transmits document content, receives content metadata, and/or transmits feedback. The input device 391 receives information associated with the computing device 310 (e.g., instructions from a user, instructions from another computing device, etc.) from a user (not shown). The input device 391 can include, for example, a keyboard, a scanner, etc. The output device 392 outputs information associated with the computing device 310 (e.g., information to a printer (not shown), information to a speaker, etc.). The display device 393 displays information associated with the computing device 310 (e.g., status information, configuration information, document content, metadata content, user feedback, etc.). The processor 394 executes the operating system and/or any other computer executable instructions for the computing device 310 (e.g., executes applications, etc.).

The storage device 395 stores content metadata, document content, and/or user feedback. The storage device 395 can store information and/or any other data associated with the computing device 310. The storage device 395 can include a plurality of storage devices and/or the computing device 310 can include a plurality of storage devices (e.g., a position storage device, an absolute satellite position device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
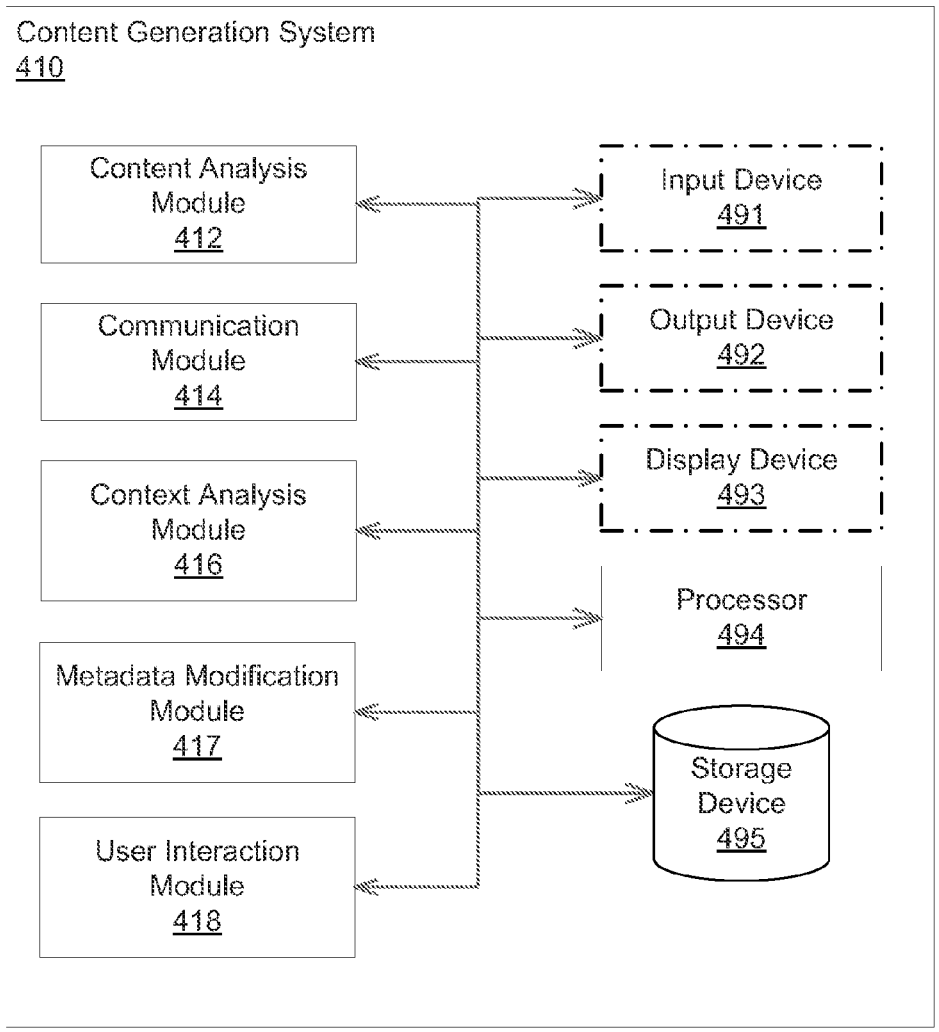
FIG. 4 is a diagram of an exemplary content generation system.

FIG. 4 is a diagram of an exemplary content generation system 410. The content generation system 410 includes a content analysis module 412, a communication module 414, a context analysis module 416, a metadata modification module 417, a user interaction module 418, an input device 491, an output device 492, a display device 493, a processor 494, and a storage device 495. The input device 491, the output device 492, and the display device 493 are optional components of the content generation system 410. In some examples, the content generation system 410 can include some or all of the modules/devices as described herein. The modules and devices described herein can, for example, utilize the processor 494 to execute computer executable instructions and/or one or more modules can each include their own processor to execute computer executable instructions (e.g., an encryption processing unit, a field programmable gate array processing unit, etc.). It should be understood that the content generation system 410 can include, for example, other modules, devices, and/or processors known in the art and/or varieties of the illustrated modules, devices, and/or processors.

The content analysis module 412 generates content metadata from document content via natural language processing based on one or more context parameters associated with the document content. The generation of the content metadata via this process enables the technology to quickly and accurately generate relevant content metadata based on the context of the document content (e.g., activity information, domain information, etc.). Table 1 illustrates exemplary document content, content metadata, and the context parameters. As illustrated in FIGS. 2A-2C, the document content 222 includes the document content illustrated in Table 1 and the content metadata 224 includes the content metadata illustrated in Table 1. In this example, the content analysis module 412 generated the content metadata via natural language processing (e.g., pattern recognition, decision trees, etc.) based on the context parameters in Table 1. In this example, the property name is the identifier and the value is the matching criteria (e.g., string matching, concept matching, etc.). The context parameters can include, for example, other context information (e.g., lists of people, lists of networks, template, word associations, etc.).

TABLE 1

Exemplary Document Content, Content Metadata, and Context Parameters

| Document Content | Content Metadata | Context Parameters |
|---|---|---|
| Joe Smith | Person Owner: Joe Smith | Property name = Person Owner; value = *first name*/*last name* |
| Engineering Sales Document | Category: Engineering, Sales | Property name = Category; value = Engineering, Engineering Technical, Engineering Sales |
| "various IP products"; "operate with TCP" | Protocol: TCP, IP | Property name = Protocol; value = TCP, IP |
| Theatre Report v11 Document; "Neutral Reaction to News"; "Group was Unfriendly to Questions" | Relationships: Theatre Reports v1-10 | Property name = Sentiment; value = Hostile, Friendly, Neutral |
| News Analysis Document; "Earth is Round"; "Earth is too cold" | Content Company: XYZ News; Content Owner: Edward Smith; Content Type: Fact | Property name = Perspective; value = Propaganda, Facts |

The communication module 414 receives user feedback about the content metadata from a computing device associated with a user. The user can be associated with the document content (e.g., author of the document content, owner of the document content, editor of the document content, etc.). For example, the communication module 414 receives data packets that include the user feedback via a computer network. As another example, the communication module 414 receives an email that includes the user feedback.

The context analysis module 416 modifies the one or more context parameters based on the received user feedback. The modification of the one or more context parameters enables the technology to adapt to customize the generation process based on the context of the document content, thereby advantageously increasing the accuracy of the content metadata generation. Table 2 illustrates exemplary user feedback and modified context parameters. As illustrated in FIGS. 2A-2C, the user feedback 226 includes the user feedback illustrated in Table 2. In this example, the content analysis module 412 modifies the context parameters in Table 1 based on the user feedback 226. In this example, the matching criteria for the values are modified based on the user feedback. In other examples, the content analysis module 416 does not modify all of the context parameters based on the user feedback 226 and/or other information associated with the document content (e.g., part of the document content is not related to the context, part of the document content is related to another context, etc.).

In other examples, the context analysis module 416 generates the one or more context parameters based on an activity associated with a type of document content (e.g., instruction form, sales document, etc.) and/or domain information associated with the activity (e.g., healthcare information, business intelligence information, etc.).

TABLE 2

Exemplary User Feedback and Modified Context Parameters

| User Feedback | Modified Context Parameters |
| --- | --- |
| Approval Rating: Executive Vice President or Above | Property name = Approval Rating; value = [Exe*] or [Sen*] Vice President |
| Protocol: TCP, IP, UDP | Property name = Protocol; value = TCP, IP, UDP |

The metadata modification module 417 modifies the content metadata based on the received user feedback. For example, the metadata modification module 417 adds the additional information as illustrated in the screenshot C 220c of FIG. 2C. The user interaction module 418 receives the document content from the computing device associated with the user (e.g., text document transmitted via an email attachment, spreadsheet uploaded via a web interface, etc.). The user interaction module 418 requests user feedback about the content metadata from the user associated with the document content (e.g., transmit an email request to the user, send a pop-up message to the computing device via a document management system, etc.).

In some examples, the domain information includes information associated with persons, entities, locations, and/or multimedia data. For example, the domain information includes a list of persons associated with the domain (e.g., list of doctors, list of vice presidents, etc.), associations between entities (e.g., ABC Corp. is a subsidiary of XYZ Corp., 123 Corp. is a competitor of 987 Corp., etc.), and/or office locations for a company (e.g., Boston office, New York office, etc.).

In other examples, the domain information includes status information, predetermined pattern information, keyword information (e.g., drug delivery, fast attack boat, etc.), and/or multimedia information (e.g., movie over four minutes in length, gunshot sounds, etc.). For example, the status information includes the sentiment of a party (e.g., ally, opponent, neutral, etc.), the date that the document content was last printed, the date that the document content became public information, and/or any other type of status information. As another example, the predetermined pattern information includes a string expression, an account number pattern, a data pattern, and/or any other type of pattern.

The input device 491 receives information associated with the content generation system 410 (e.g., instructions from a user, instructions from another computing device, etc.) from a user (not shown). The input device 491 can include, for example, a keyboard, a scanner, etc. The output device 492 outputs information associated with the content generation system 410 (e.g., information to a printer (not shown), information to a speaker, etc.).

The display device 493 displays information associated with the content generation system 410 (e.g., document content, metadata content, etc.). The processor 494 executes the operating system and/or any other computer executable instructions for the content generation system 410 (e.g., executes applications, etc.).

The storage device 495 stores document content, metadata content, and/or user feedback. The storage device 495 can store information and/or any other data associated with the content generation system 410. The storage device 495 can include a plurality of storage devices and/or the content generation system 410 can include a plurality of storage devices (e.g., a metadata storage device, a document storage device, etc.). The storage device 495 can include, for example, long-term storage (e.g., a hard drive, a tape storage device, flash memory, etc.), short-term storage (e.g., a random access memory, a graphics memory, etc.), and/or any other type of computer readable storage.

Figure 5:
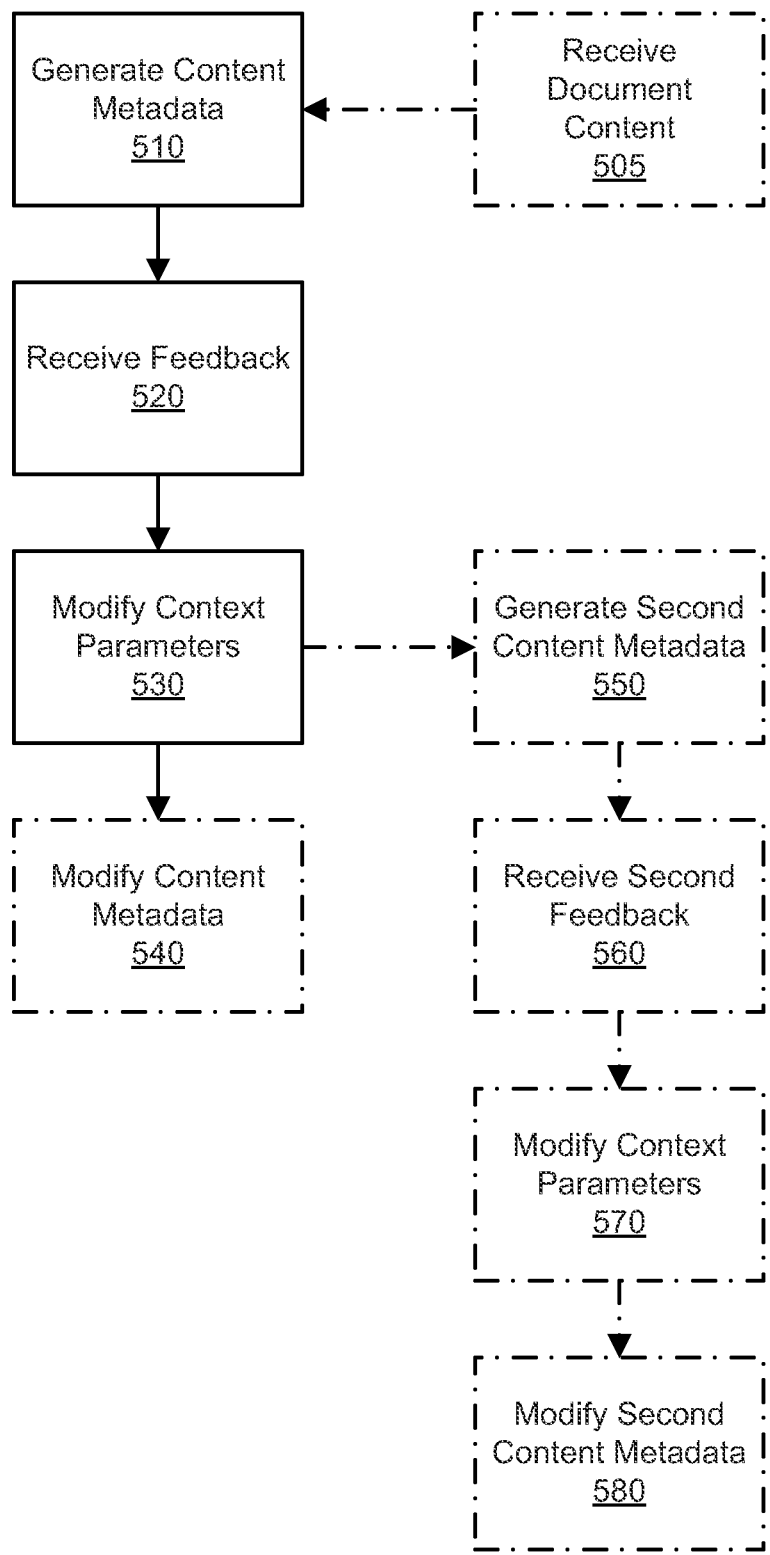
FIG. 5 is a flowchart of an exemplary content generation method.

FIG. 5 is a flowchart of an exemplary content generation method 500 utilizing, for example, the content generation system 410 of FIG. 4. The content analysis module 412 generates (510) content metadata from document content via natural language processing based on one or more context parameters associated with the document content. The communication module 414 receives (520) user feedback about the content metadata from a computing device (e.g., the computing device 120 of FIG. 1) associated with a user (e.g., the user 115 of FIG. 1) associated with the document content. The context analysis module 416 modifies (530) the one or more context parameters (e.g., adds a new context parameter, deletes a context parameter, edits a context parameters, etc.) based on the received user feedback.

In some examples, the metadata modification module 417 modifies (540) the content metadata (e.g., adds new information, deletes information, edits information, etc.) based on the received user feedback.

In other examples, the generating (510), the receiving (520), and the modifying (530) are processed substantially in real-time after receipt of the document content. For example, the steps (510, 520, and 530) occur within ten seconds of receipt of the document content. As another example, the steps (510, 520, and 530) occur within one minute of receipt of the document content.

In some examples, the communication module 412 receives (505) the document content from the computing device (e.g., the computing device 120 of FIG. 1) associated with the user (e.g., the user 115 of FIG. 1). In other examples, the receiving (505), the generating (510), the receiving (520), and the modifying (530) occur sequentially in substantially real-time.

In some examples, the content analysis module 412 generates (550) second content metadata from second document content via natural language processing based on the modified one or more context parameters (e.g., the context parameters modified in step 530) associated with the second document content. The communication module 414 receives (560) second user feedback about the second content metadata from a second user associated with the second document content. The context analysis module 416 modifies (570) the one or more context parameters based on the received user feedback. In other examples, the context analysis module 416 modifies (580) the second content metadata based on the second user feedback.

In some examples, the one or more context parameters are indicative of an activity associated with the document content. For example, the one or more context parameters are indicative of the document content being associated with a healthcare intake. As another example, the one or more context parameters are indicative of the document content being associated with an intelligence report.

In other examples, the content metadata includes metadata about the document content (e.g., reading level, author, organization, etc.), one or more concepts associated with the document content (e.g., business intelligence information, critical care patient, etc.), and/or one or more indicators associated with the document content (e.g., approved status, completeness status, public disclosure, etc.).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An automated content generation system, the system comprising:
 a content analysis module configured to generate content metadata from document content via natural language processing based on one or more context parameters associated with the document content;
 a communication module configured to receive user feedback about the content metadata from a computing device associated with a user associated with the document content; and
 a context analysis module configured to modify the one or more context parameters based on the received user feedback.

2. The automated content generation system of claim 1, further comprising a metadata modification module configured to modify the content metadata based on the received user feedback.

3. The automated content generation system of claim 1, further comprising:
 a user interaction module configured to:
  receive the document content from the computing device associated with the user; and
  request user feedback about the content metadata from the user associated with the document content.

4. The automated content generation system of claim 1, wherein the context analysis module further configured to generate the one or more context parameters based on an activity associated with a type of document content, domain information associated with the activity, or any combination thereof.

5. The automated content generation system of claim 4, wherein the domain information comprises information associated with persons, entities, locations, multimedia data, or any combination thereof.

6. The automated content generation system of claim 4, wherein the domain information comprises status information, predetermined pattern information, keyword information, multimedia information, or any combination thereof.

7. A method for automated content generation, the method comprising:
 (a) generating content metadata from document content via natural language processing based on one or more context parameters associated with the document content;
 (b) receiving user feedback about the content metadata from a computing device associated with a user associated with the document content; and
 (c) modifying the one or more context parameters based on the received user feedback.

8. The method of claim 7, further comprising (d) modifying the content metadata based on the received user feedback.

9. The method of claim 7, wherein steps (a), (b), and (c) are processed substantially in real-time after receipt of the document content.

10. The method of claim 7, further comprising:
 (a-1) receiving the document content from the computing device associated with the user, and
 wherein steps (a-1), (a), (b), and (c) occur sequentially in substantially real-time.

11. The method of claim 7, further comprising:
 (d) generating second content metadata from second document content via natural language processing based on the modified one or more context parameters associated with the second document content;
 (e) receiving second user feedback about the second content metadata from a second user associated with the second document content; and
 (f) modifying the one or more context parameters based on the received user feedback.

12. The method of claim 11, further comprising (g) modifying the second content metadata based on the second user feedback.

13. The method of claim 7, wherein the one or more context parameters are indicative of an activity associated with the document content.

14. The method of claim 7, wherein the content metadata comprises metadata about the document content, one or more concepts associated with the document content, one or more indicators associated with the document content, or any combination thereof.

15. A computer program product, tangibly embodied in an information carrier, the computer program product including instructions being operable to cause a data processing apparatus to:
 generate content metadata from document content via natural language processing based on one or more context parameters associated with the document content;
 receive user feedback about the content metadata from a computing device associated with a user associated with the document content; and
 modify the one or more context parameters based on the received user feedback.

* * * * *